United States Patent Office 3,540,122
Patented Nov. 17, 1970

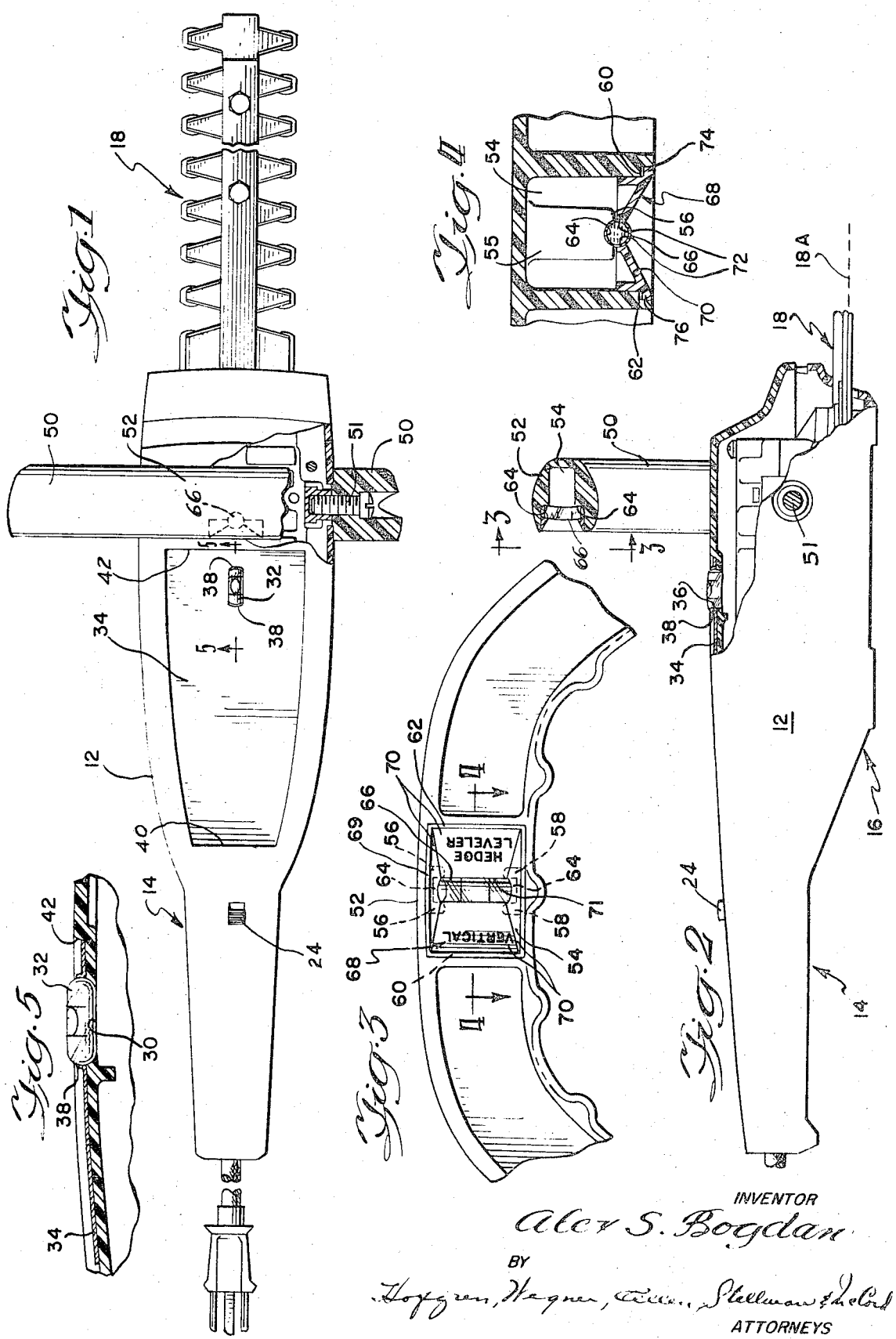

3,540,122
HEDGE TRIMMER AND LEVELING SYSTEM
FOR SAME
Alex S. Bogdan, Chicago, Ill., assignor to G. W. Murphy
Industries, Inc., a corporation of Texas
Filed Oct. 30, 1967, Ser. No. 679,111
Int. Cl. B26g 15/00
U.S. Cl. 30—123                                        3 Claims

ABSTRACT OF THE DISCLOSURE

A hedge trimming device which has a blade driven through a cutting plane and including a level indicating system having two cylindrical spirit level capsules each replaceably mounted on the trimmer casing, one with its axis parallel to the cutting plane and the other with its axis perpendicular to the cutting plane. One capsule is held in a depression in the casing top wall by a releasable snap plate frame arrangement, and the other is held in a receiver indentation in a vertically disposed handle by a tapered receiver cover plate engaging the capsule sides.

CROSS REFERENCES TO RELATED APPLICATIONS

A hedge trimming device which is useful in the combination of the present invention is described by William H. Scott in application Ser. No. 543,372, filed Apr. 18, 1966, entitled Hedge Trimmer, now Patent No. 3,431,647. Reference can be made to the Scott application for description of details of operating mechanisms and assembly of such a hedge trimmer.

BACKGROUND OF THE INVENTION

Field of the invention

This invention relates to hedge trimmers and more particularly relates to systems for determining true vertical and horizontal planar cutting paths of hedge trimmer blades.

Description of the prior art

Hedge trimmers are well known and in common use by the home gardener. However, because the user is often a novice and untrained in the art of trimming hedges, it has been found desirable to attach some sort of leveling device to the hedge trimmer so that the user can be sure that the blade is level for a neater trimming job. Heretofore, such a leveling device has been secured to the hedge trimmer in such a manner as to render its replacement impossible and/or the device has been used to show only the horizontal disposition of the cutting blade.

SUMMARY OF THE INVENTION

The present invention provides a hedge trimming device including two level indicators, one for indicating the true horizontal disposition of the cutting plane of the blade and the other for indicating the true vertical disposition of the cutting plane. In the preferred form, the level indicators are cylindrical spirit level capsules and one is mounted parallel to the cutting plane, while the other is mounted perpendicular to the cutting plane. The level indication system is especially useful in a hedge clipper which is provided with a handle end on the clipper casing with the blade and cutting plane extending from the other end; an upstanding transverse handle bar is secured to the casing and the two level indicators, which are preferably cylindrical spirit level capsules, are so mounted as to indicate the true horizontal and true vertical disposition of the cutting plane.

In a preferred form of the device, the level indicators are releasably mounted and therefore this invention also provides mounting systems for releasably mounting a level indicator. In one form of mounting system, the level indicator is secured in an indentation parallel to the blade plane by a frame member which snap-fits over the level indicator, leaving the level indicator sufficiently uncovered for proper viewing. In another form, a receiver or recess is provided in the trimmer casing, preferably in a transverse potion of an upstanding handle, and the level indicator is held in the recess by a superposed cover system adhered in the recess and engaging the indicator while leaving the indicator sufficiently uncovered for proper viewing.

BRIEF DESCRIPTION OF THE DRAWING

FIG. 1 is a fragmentary top plan view of a hedge trimmer device employing the principles of this invention;

FIG. 2 is a fragmentary side plan view of the device of FIG. 1;

FIG. 3 is an enlarged fragmentary view of a handle of the device from along line 3—3 of FIG. 2;

FIG. 4 is an enlarged section along line 4—4 of FIG. 3; and

FIG. 5 is an enlarged section along line 5—5 of FIG. 1.

DESCRIPTION OF THE PREFERRED EMBODIMENTS

Turning first to FIG. 1 of the drawings, the hedge trimmer includes a casing 12 having a handle portion 14 at one end and a wide housing portion 16 terminating in the other end. A hedge cutting blade system 18 is mounted extending from the end defined by housing portion 16 to be driven through a straight reciprocal cutting stroke in a cutting plane indicated by dotted line 18a in FIG. 2. An electric motor and power train are mounted within the housing portion 16 of casing 12 for driving blade 18 through its stroke. Suitable control means in the form of a switch 24 is provided at the handle portion 14 of the casing and is accessible from the casing exterior for energizing and deenergizing the electric motor. The specific assembly of casing 12 and the operation of the electric motor and power train for driving the blade system 18 through its planar cutting stroke are fully described in the aforementioned Scott application Ser. No. 543,372 to which reference can be made by those in the art.

Turning to FIGS. 2 and 5, an indentation is provided at 30 in the top wall of casing 12 in housing portion 16. The floor of indentation 30 is generally parallel to the blade cutting path and is of proper extent for supporting a first cylindrical spirit leveling capsule 32. The indentation is relatively crudely cast into the casing and yet provides a relatively precise nest or centering device for locating the capsule with its centerline parallel to the axis of the cutting blades 18. A facing plate 34 is provided and has an opening 36 with an upstanding peripheral flange 38 circumscribing the opening 36. Flange 38 defines a mounting frame for containing the capsule 32 in indentation 30. Plate 34 is releasably mounted by snap mounting between a pair of opposing rib means 40 and 42 formed in the top wall of casing 12. Rib means 40 and 42 are spaced from opposite ends of the capsule 32 and releasably receive the facing plate by its edges with the facing plate 34 snap-fitted therebetween. Thus, facing plate 34, which holds capsule 32 in indentation 30 by engagement of flanges 38 with the side walls of capsule 32 above the centerline thereof, is manually removable for access to indentation 30 and replacement of the capsule 32 should the capsule become broken.

A loop-shaped handle bar 50 defines a second handle means for gripping the hedge trimming device. Handle bar 50 is open providing two facing ends and the ends are secured by suitable bolts 51 to the side walls of casing 12 at the widened housing portion 16. Handle bar 50 upstands from and is generally perpendicular to the casing with respect to the floor of indentation 30. It will be seen that the handle bar 50 has an outward extent 52 which is spaced above and transverse to the casing 12 for free gripping of the handle bar.

A deep four-walled recessed receiver 54 (FIGS. 2 through 4) is provided in the outward extent 52 of handle bar 50 with the opening of said receiver 54 facing the handle portion 14 of casing 16 for easy viewing of the open face of the receiver 54 by the operator of the trimming device when the device is in vertical cutting position. A pair of inwardly projecting legs 55 having opposing pairs of shoulders 56 and 58 formed on the exposed ends thereof are located in the receiver 54 and are spaced from the receiver top lip or edge and are located on opposite walls of the receiver 54 as viewed in FIG. 2. Offset shoulders 60 and 62 are provided on opposite ends of the receiver 54 and extend between the walls bearing the first pair of legs 55.

An indentation 64 is centrally located between each pair of shoulders 56 and 58 and aligned between the shoulders for receiving opposite ends of a second cylindrical spirit level capsule 66, such that the capsule 66 spans the portion of the receiver 54 between shoulders 56 and 58. The location of the shoulders 56, 58 and indentation 64 is such that when the end portions of capsule 66 are nested therein the centerline of the will lie perpendicular to the axis of the blades 18. A cover member 68 is adapted to be press fit into the opening of the receiver 54 to hold the capsule in proper position therein. The cover 68 has an outer edge 69 completely surrounding the cover. From each side of said edge 69 a face wall 70 slopes downwardly toward a central opening 71. The two side face walls are relatively short while the two end face walls are longer and terminate in a pair of slightly concave surfaces 72 which face each other on opposite sides of the opening 71. The surfaces 72 are adapted to engage the upper rounded surfaces of the capsule 66 to hold the capsule nested in the indentations 64 in the legs 55. The cover 68 has undercut shoulders 74, 76 on its opposite ends which are adapted to coincide with the offset shoulders 60 and 62 in the receiver 54 such that as the cover 68 is pressed down into the opening of the receiver 54, the surfaces 72 on the edges of the opening 71 will snuggly engage and seat the capsule 66 at the same time the shoulders 74, 76 seat against the shoulders 60, 62 in the receiver. Indicia can be put on the face of the cover 68 for indicating the use for the capsule 66. The cover 68 can be removed from the receiver 54 so as to replace or repair the capsule 66. The indentations 64 are relatively simple elements to form in the receiver 54 and yet they cooperate with the capsule and cover to provide a quite accurate locator for positioning the leveler for proper use.

It will be seen that the capsule 32 is a cylindrical capsule having its axis or centerline parallel to the plane of cutting of blade 18 while the capsule 66 has its centerline or axis perpendicular to the cutting plane. As the device is tilted during use between positions of vertical and horizontal dispositions of the cutting plane to align the device in one of the two positions, the capsules will show the true position. Capsule 32 being parallel to the blade will show when the blade is in true horizontal position while capsule 66 being perpendicular to the cutting plane of the blade will show when the cutting plane is in true vertical position. The indications of levelness are readily viewable by the operator with the device in the respective positions, thereby enabling the operator to keep the cutting plane of the blade in either true vertical or true horizontal position for neater cutting operations.

While this invention is susceptible of embodiment in many different forms, there is shown in the drawings and has been described in detail a specific embodiment of the invention together with modifications thereof with the understanding that the present disclosure is to be considered as an exemplification of the principles of the invention and is not intended to limit the invention to the embodiment or modifications illustrated.

I claim:

1. A hedge trimming device comprising casing means, blade means mounted on said casing means for movement through a generally planar cutting stroke, means for driving said blade through said stroke, first and second level capsules, means securing said first level capsule to said casing means in proper disposition for indicating true horizontal disposition of the plane of the cutting stroke, means for removably mounting said first capsule and means securing said second level capsule to said casing means in proper disposition for indicating true vertical disposition of the plane of the cutting stroke, said mounting means for said second capsule comprises a receiver in said casing means, a first pair of opposing shoulders in said receiver spaced from the top lip of the receiver widening the receiver outwardly in opposing vertical directions, a second pair of opposing shoulders between said first pair and the top lip of the receiver further widening the receiver outwardly in two lateral opposing directions normal to the first two directions, an indentation located in each shoulder of said first pair of shoulders for receiving said second level capsule in vertical disposition relative to the blade path and in position spanning the portion of the receiver between said shoulders of said first pair, and an inwardly sloped receiver, cover means removably adhered to the shoulders of the second pair and engaging said second capsule to secure the capsule in the indentations of the first pair of shoulders.

2. A hedge trimming device comprising a casing having a handle portion at one end and a widened housing portion terminating in the other end, a blade mounted at said other end for movement through a reciprocal cutting stroke in a cutting plane, an indentation in the casing top wall at said widened portion having a floor generally parallel to the blade stroke plane for supporting a first cylindrical spirit level capsule, a facing plate having an opening and an upstanding flange circumscribing said opening defining a mounting frame for peripherally engaging said first capsule outwardly of its center line and holding said first capsule in said indentation with said capsule visible through said opening and in parallel disposition relative to the plane of the blade path, rib means on said casing spaced from opposite ends of said capsule for releasably engaging end edges of said facing plate for releasably mounting said facing plate by snap receiving the facing plate at the ends thereof between said ribs whereby said facing plate holds said first capsule by said frame in said indentation and whereby upon snap removal of said facing plate said first capsule is replaceable, a loop-shaped handle bar secured at its ends to opposite side walls of said casing at said housing portion and upstanding from said casing to define a grippable handle bar extending generally perpendicular to said casing top wall, said loop having an outward extent spaced above said casing and transverse to the longitudinal axis of the casing, a four-walled receiver in said outward extent facing said handle portion of said casing, a first pair of opposing shoulders in said receiver spaced from the top lip of the receiver widening the receiver outwardly in opposing vertical directions relative to said casing top wall, a second pair of opposing shoulders between said first pair and the top lip of the receiver further widening the receiver outwardly in two lateral opposing directions normal to the first two directions, an indentation centrally located in each of said first pair of shoulders for receiving opposing ends of a second cylindrical spirit level capsule in position spanning the portion of the four-walled receiver between said shoulders of said first pair, and an inwardly sloped receiver cover member removably adhered to the shoulders of the second pair and engaging said second capsule along the sides thereof outwardly of the capsule center line to secure the capsule in the indentations of the first pair of shoulders and in vertical disposition relative to the plane of the blade path whereby said first and second capsules are disposed transverse to the normal tipping axis of said hedge trimming device as said device is tipped by vertical movement of said handle portion relative to said outward extent.

3. A hedge trimming device comprising a casing having a handle portion at one end and a widened housing portion terminating in the other end, a blade mounted at said other end for movement through a reciprocal cutting stroke in a cutting plane, an electric motor and power train mounted in said housing portion for driving said blade through said stroke, a loop-shaped handle bar secured at its ends to opposite side walls of said casing at said housing portion and upstanding from said casing to define a grippable handle bar extending generally perpendicular to said casing top wall, said loop having an outward extent spaced above said casing and transverse to the longitudinal axis of the casing, a receiver in said outward extent having an opening facing said handle portion of said casing, a first pair of opposing shoulders at opposite walls in said receiver spaced from the top of the receiver, a second pair of opposing shoulders widening the receiver outwardly in two lateral opposing directions, an indentation located in each shoulder of said first pair of shoulders for receiving opposing ends of a cylindrical spirit level capsule in position spanning the portion of the four-walled receiver between said shoulders of said first pair with the axis of said capsule perpendicular to the blade cutting plane, and a cover member removably seated in the opening of the receiver and having surfaces engaging said spirit level capsule along the sides thereof outwardly of the capsule center line to secure the capsule in the indentations of the first pair of shoulders.

References Cited
UNITED STATES PATENTS

| | | | |
|---|---|---|---|
| 1,292,969 | 1/1919 | Sturgis | 7—1 |
| 1,884,469 | 10/1932 | Winter | 7—13 |
| 2,212,430 | 8/1940 | Zimmerman | 33—207 X |
| 2,541,366 | 2/1951 | Kennedy | 33—207 |
| 2,655,733 | 10/1953 | Costa | 7—13 |
| 2,919,922 | 1/1960 | Skelly | 33—207 X |
| 3,052,036 | 9/1962 | Oliver | 33—207 |
| 3,431,647 | 3/1969 | Scott | 30—210 |
| 2,323,188 | 6/1943 | Atkinson | 30—272 X |

ROBERT C. RIORDON, Primary Examiner

J. C. PETERS, Assistant Examiner

U.S. Cl. X.R.

30—210; 33—207; 66—233